(12) United States Patent
El-Najjar et al.

(10) Patent No.: US 10,425,867 B2
(45) Date of Patent: Sep. 24, 2019

(54) PROVIDING AUTOMATED NEIGHBOR RELATION TO USER EQUIPMENTS

(71) Applicant: TELEFONAKTIEBOLAGET LM ERICSSON (PUBL), Stockholm (SE)

(72) Inventors: Jad El-Najjar, Montreal (CA);
Suliman Albasheir, Issaquah, WA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/557,770

(22) PCT Filed: Mar. 16, 2015

(86) PCT No.: PCT/IB2015/051918
§ 371 (c)(1),
(2) Date: Sep. 12, 2017

(87) PCT Pub. No.: WO2016/147028
PCT Pub. Date: Sep. 22, 2016

(65) Prior Publication Data
US 2018/0077615 A1 Mar. 15, 2018

(51) Int. Cl.
*H04W 36/00* (2009.01)
*H04W 36/08* (2009.01)
(Continued)

(52) U.S. Cl.
CPC ... *H04W 36/0083* (2013.01); *H04W 36/0027* (2013.01); *H04W 36/0061* (2013.01);
(Continued)

(58) Field of Classification Search
CPC ............ H04W 36/0083; H04W 36/08; H04W 36/0027; H04W 36/30; H04W 36/26; H04W 36/0061; H04W 36/00835
See application file for complete search history.

(56) References Cited

U.S. PATENT DOCUMENTS 6,295,450 B1 * 9/2001 Lyer ..................... H04W 36/26
455/417
8,249,598 B1 * 8/2012 Khanka ............ H04W 36/0061
370/320

(Continued)

FOREIGN PATENT DOCUMENTS

| EP | 1635593 A1 | 3/2006 |
| EP | 2750447 A1 | 7/2014 |

OTHER PUBLICATIONS

Sujuan Feng et al., Self-Organizing Networks (SON) in 3GPP Long Term Evolution, Nomor Research GmbH, Munich, Germany, May 20, 2008, pp. 1-15.

(Continued)

*Primary Examiner* — Nam T Huynh
(74) *Attorney, Agent, or Firm* — Sage Patent Group

(57) ABSTRACT

A network node in a communication network provides Automated Neighboring Relation (ANR) data to User Equipments (UEs). The network node collects information of ongoing end-to-end traffic sessions from other network nodes in the communication network, and determines service characteristics of Radio Base Stations (RBSs) based on the collected information. For each RBS, the network node creates an ANR record indicating the determined service characteristics of neighboring RBSs. The network node then transmits the ANR record to each RBS to cause the RBS to propagate the ANR record to attached UEs.

13 Claims, 6 Drawing Sheets

(51) Int. Cl.
*H04W 36/26* (2009.01)
*H04W 36/30* (2009.01)

(52) U.S. Cl.
CPC ..... *H04W 36/00835* (2018.08); *H04W 36/08* (2013.01); *H04W 36/26* (2013.01); *H04W 36/30* (2013.01)

(56) References Cited

U.S. PATENT DOCUMENTS

| | | |
|---|---|---|
| 2008/0207207 A1 | 8/2008 | Moe et al. |
| 2010/0075677 A1* | 3/2010 | Wang ................ H04W 36/0055 455/436 |
| 2016/0014648 A1* | 1/2016 | Hamilton .......... H04W 36/0083 455/436 |

OTHER PUBLICATIONS

International Search Report from corresponding application PCT/IB2015/051918.
EP Office Action for European Patent Application No. 15717234.7, dated Jul. 18, 2019, 7 pages.

\* cited by examiner

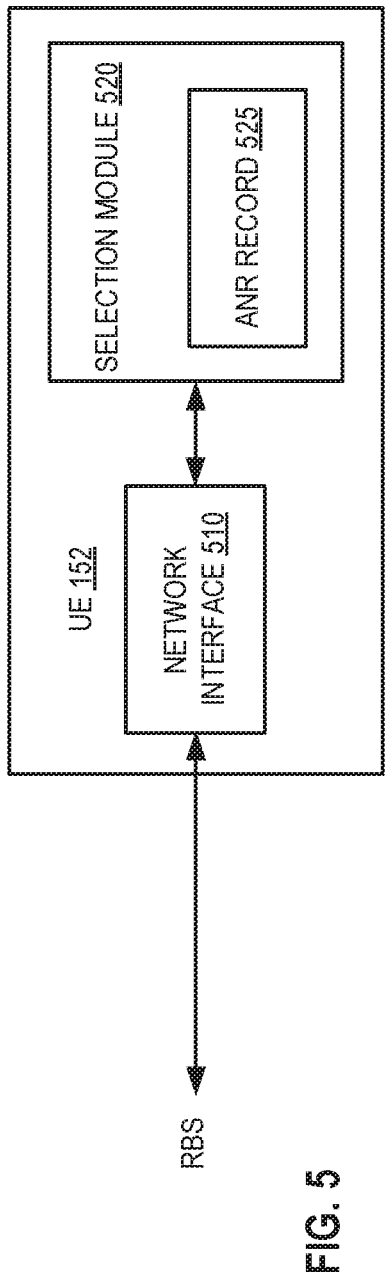

PROVIDING AUTOMATED NEIGHBOR RELATION TO USER EQUIPMENTS

TECHNICAL FIELD

Embodiments of the invention relate to Automated Neighbor Relation (ANR) in a communication network.

BACKGROUND

Automated Neighbor Relation (ANR), also referred to as Automatic Neighbor Relation, was introduced to Long Term Evolution (LTE) 4G networks as a feature of a Self-Optimizing Network. This feature allows an Evolved Universal Terrestrial Radio Access Network (E-UTRAN) NodeB (abbreviated as EnodeB) in an LTE network to automatically populate its neighboring relations based on User Equipment (UE) activities in the neighborhood, such as handovers, tracking area updates and cell reselection. ANR allows an EnodeB to discover its neighboring EnodeB cells. Moreover, ANR enables an EnodeB to associate and identify all its exterior Radio Frequency (RF) signals that are propagated by its neighboring EnodeBs.

In a conventional handover scheme, a UE is attached to an EnodeB that provides the best RF signal quality with respect to the Signal to Interference plus Noise Ratio (SINR). A source EnodeB will allow its attached UE to handover to its neighboring EnodeB (which has been defined by the ANR of the source EnodeB) when the SINR of the neighboring EnodeB becomes higher than that of the source EnodeB. However, in conventional systems, the EnodeB that provides a higher SINR may not be the best choice for handover when considering the UE's overall requirements or the network's traffic conditions.

SUMMARY

According to one embodiment, a method is provided to be performed by a network node in a communication network for providing ANR data to UEs. The method comprises: collecting information of ongoing end-to-end traffic sessions from other network nodes in the mobile communication network; determining service characteristics of Radio Base Stations (RBSs) based on the collected information; creating, for each RBS, an ANR record indicating the determined service characteristics of neighboring RBSs; and transmitting the ANR record to each RBS to cause the RBS to propagate the ANR record to attached UEs.

According to another embodiment, a network node is provided in a communication network for providing ANR data to UEs. The network node comprises a circuitry adapted to cause the network node to collect information of ongoing end-to-end traffic sessions from other network nodes in the mobile communication network; determine service characteristics of RBSs based on the collected information; create, for each RBS, an ANR record indicating the determined service characteristics of neighboring RBSs; and transmit the ANR record to each RBS to cause the RBS to propagate the ANR record to attached UEs.

In one embodiment, the circuitry comprises a processor, a memory and an interface both coupled with the processor. The memory contains instructions that, when executed, cause the processor to collect information of ongoing end-to-end traffic sessions from other network nodes in the mobile communication network; determine service characteristics of RBSs based on the collected information; create, for each RBS, an ANR record indicating the determined service characteristics of neighboring RBSs; and transmit the ANR record to each RBS to cause the RBS to propagate the ANR record to attached UEs.

According to yet another embodiment, a network node is provided in a communication network for providing ANR data to UEs. The network node comprises a receiver module adapted to collect information of ongoing end-to-end traffic sessions from other network nodes in the mobile communication network; a service characteristics determination module adapted to determine service characteristics of RBSs based on the collected information; an ANR creation module adapted to create, for each RBS, an ANR record indicating the determined service characteristics of neighboring RBSs; and a transmitter module adapted to transmit the ANR record to each RBS to cause the RBS to propagate the ANR record to attached UEs.

According to one embodiment, a method is provided to be performed by a UE in a communication network. The method comprises: receiving an ANR record from an RBS to which the UE is attached, wherein the ANR record is derived from information of ongoing end-to-end traffic sessions in the communication network and indicates service characteristics of neighboring RBSs; and selecting one of the neighboring RBSs for handover based on the ANR record.

According to another embodiment, a UE in a communication network is provided. The UE comprises a circuitry adapted to cause the UE to receive an ANR record from an RBS to which the UE is attached, wherein the ANR record is derived from information of ongoing end-to-end traffic sessions and indicates service characteristics of neighboring RBSs; and selecting one of the neighboring RBSs for handover based on the ANR record.

In one embodiment, the circuitry comprises a processor, a memory and an interface both coupled with the processor. The memory contains instructions that, when executed, cause the processor to receive an ANR record from an RBS to which the UE is attached, wherein the ANR record is derived from information of ongoing end-to-end traffic sessions and indicates service characteristics of neighboring RBSs; and selecting one of the neighboring RBSs for handover based on the ANR record.

According to yet another embodiment, a UE in a communication network is provided. The UE comprises a network interface adapted to receive an ANR record from an RBS to which the UE is attached, wherein the ANR record is derived from information of ongoing end-to-end traffic sessions and indicates service characteristics of neighboring RBSs; and a selection module adapted to select one of the neighboring RBSs for handover based on the ANR record.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

FIG. 5 illustrates a block diagram of a UE according to one embodiment.

FIG. 6 illustrates an example of an ANR record according to one embodiment.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a centralized system that uses traffic data collected from a mobile or communication network to create ANR data for each Radio Base Station (RBS) in the network. A UE may use the ANR data to select a best suited RBS based on the current UE needs, e.g., the services running on the UE. According to the embodiments of the invention, the ANR data is updated dynamically and intelligently, taking into account ongoing end-to-end traffic sessions. The end-to-end traffic sessions provide traffic data not only for the connections to/from an RBS, but also the paths throughout the mobile network. For each RBS, the centralized system generates ANR data indicating service characteristics of its neighboring RBSs (also referred to as "neighbors"). The term "service characteristics" refers to the characteristics of the services or sessions running on the RBSs. In one embodiment, the service characteristics include, but are not limited to, signal quality (also referred to as signal strength, e.g., SINR) and service quality (e.g., Quality of Service (QoS)). In one embodiment, the service characteristics may also include an indication of whether a neighboring RBS is an indoor or outdoor RBS.

In one embodiment, the ANR data includes a lifetime indicator to indicate the lifecycle of the data. The lifetime indicator indicates a specific amount of time for which the ANR data is good or accurate to reflect the dynamic behavior of the traffic in the network. The ANR data provided to an RBS (also referred to as an ANR record) may include one or more lifetime indicators. For example, in an ANR record, the lifetime indicator may be per neighbor, or per QoS class and per neighbor.

In one embodiment, the ANR data is provided to a UE for the UE to select a best suited RBS for handover according to the UE's criteria. The ANR data may be sent to the UE periodically to reflect the current traffic conditions and updated traffic forecasts. In one embodiment, to achieve global end-to-end capacity optimization, the UE's selection (e.g., RBS1) may be overwritten by the centralized system's policy such that a different neighboring RBS (e.g., RBS2) with more available capacity than RBS1 is chosen for handover.

Figure 1:
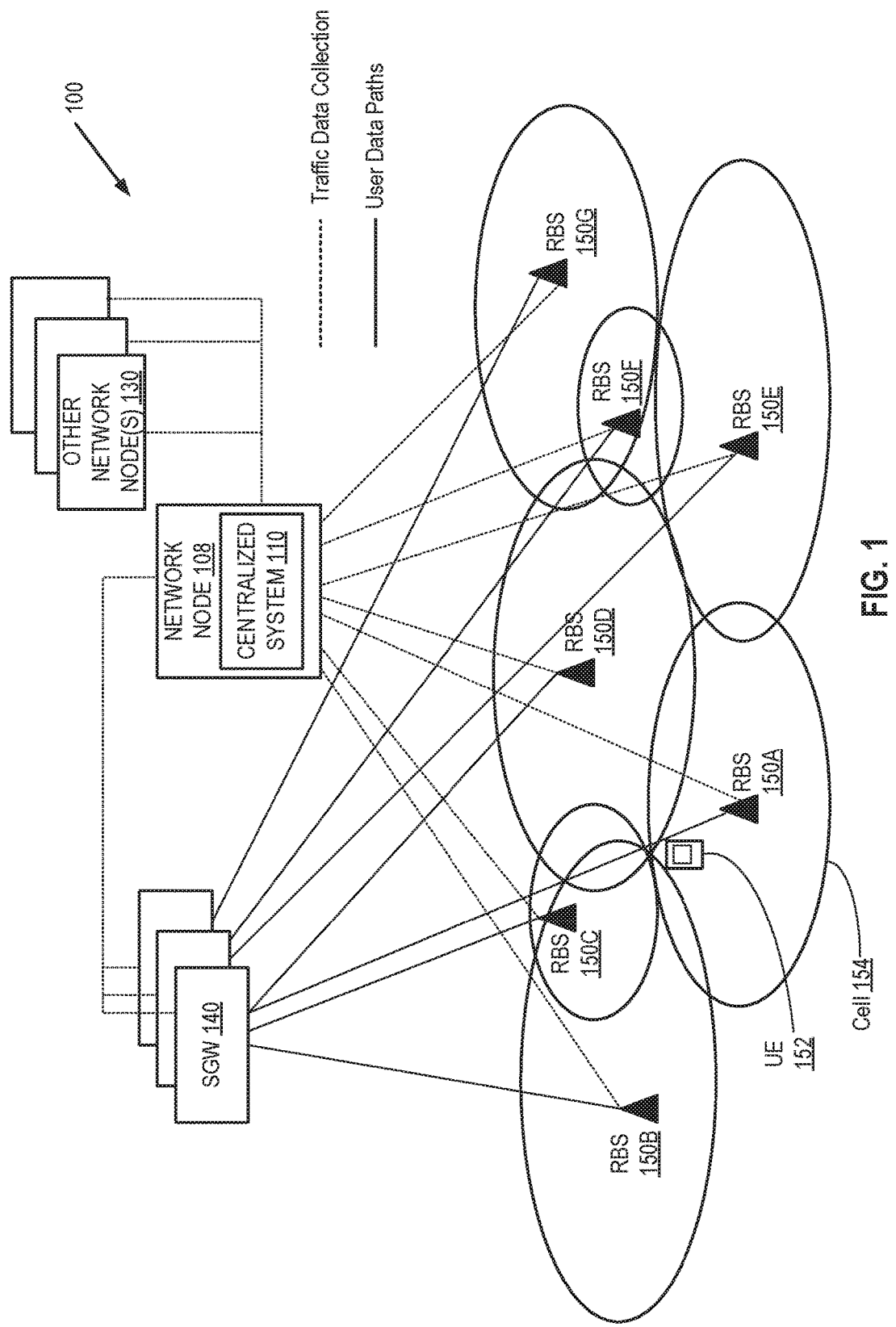
FIG. 1 illustrates a communication network according to one embodiment.

FIG. 1 is a block diagram illustrating a communication network 100 that provides a dynamic, intelligent ANR creation technique according to one embodiment. For simplicity, only part of the network 100 is shown. Examples of the network 100 include, but are not limited to, an LTE network, a Wideband Code Division Multiple Access (WCDMA) network, and any mobile networks that use radio base stations to provide wireless RF access to mobile users/devices. In the following description, the terms "communication network" and "mobile network" are used interchangeably.

The network 100 includes a plurality of RBSs 150A-G, each providing wireless service coverage to a cell 154. In one embodiment, the network 100 is a heterogeneous network in which the RBSs 150A-G have different capacities, different service quality, and/or may be located in different environments. The cells 154 may have different sizes; some of the cells 154 may partially or entirely overlap. Examples of the cells 154 include, but are not limited to: macrocells, microcells, picocells, femtocells, etc.

The network 100 includes a network node 108 in which a centralized system 110 is located. The centralized system 110 is connected, directly or indirectly to the RBSs 150A-G, Serving Gateways (SGWs) 140 and other network nodes 130. The centralized system 110 collects information of ongoing end-to-end traffic sessions throughout the network 100 (e.g., from the RBSs 150A-G, SGWs 140 and the other network nodes 130), and generates ANR records for each of the RBSs 150A-G to propagate to their respective UEs. FIG. 1 shows the collection of the end-to-end traffic session information by the centralized system 110 (shown as dotted lines). In one embodiment, the centralized system 110 periodically transmits the ANR records to the RBSs 150A-G. ANR data with expired lifetime is deleted by the RBSs 150A-G. The RBSs 150A-G, in turn, periodically transmit the unexpired ANR updates to their attached UEs. Alternatively, the UEs may periodically request the RBSs 150A-G to send ANR updates to them. Examples of the UEs include, but are not limited to, mobile phones and other portable communication devices.

The ANR records are provided to the UEs for the UEs to choose a best suited RBS for wireless service coverage. Such a best suited RBS may be different from time to time. For example, a UE 152 originally attached to the RBS 150A may be better served by the RBS 150C, if the RBS 150C has just freed up some network capacity or if the end-to-end traffic paths going through the RBS 150A become congested or experience delays or low throughput. Other scenarios for the UE 152 to switch to a different RBS include, but are not limited to, when a new RBS is set up in the neighborhood, when the UE 152 moves to a different location, or when a bottleneck is formed at one of the network nodes (130 or 140) that serves the RBS to which the UE 152 is attached. The technique for selecting a best suited RBS will be described in detail later with reference to FIGS. 5 and 6.

Figure 2:
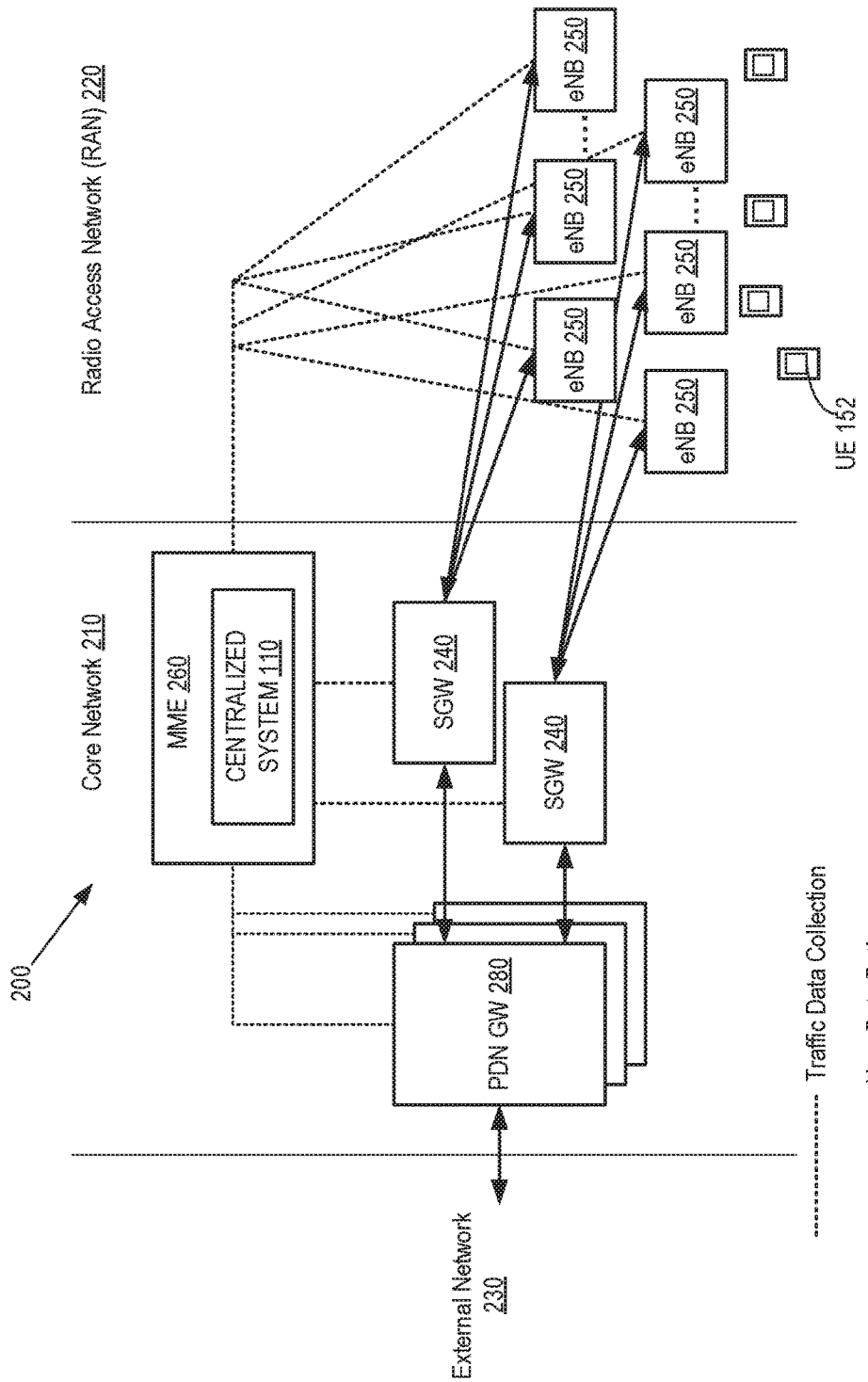
FIG. 2 illustrates an LTE network according to one embodiment.

FIG. 2 is a block diagram illustrating an LTE network 200 according to one embodiment. Signal transmission paths for user data are shown in solid lines, and traffic data collection is shown in dotted lines. For simplicity, not all network elements are shown in FIG. 2.

The LTE network 200 includes a core network 210 and a Radio Access Network (RAN) 220. The core network 210 includes one or more Packet Data Network Gateways (PDN-GWs) 280, which are responsible for IP address allocation to the UEs, as well as QoS enforcement and flow-based charging. The PDN-GW 280 provides connectivity from the UEs to external packet data networks (e.g., an external network 230) by being the point of exit and entry. The core network 210 also includes one or more SGWs 240, each of which routes and forwards user data packets, while also serving as the mobility anchor for the UEs during inter-EnodeB handovers. The SGWs 240 handle session control signaling via a control node, the Mobility Management Entity (MME) 260. In one embodiment, the centralized system 110 described in connection with FIG. 1 is part of the MME 260. In alternative embodiments, the centralized system 110 may be a standalone network node or co-located with other network nodes in FIG. 2.

The RAN 220 includes multiple EnodeBs 250, each of which corresponding to one of the RBSs 150A-G in FIG. 1. The EnodeB 250 is the hardware that communicates directly with the UEs. In one embodiment, the centralized system 110 periodically transmits the ANR records to the EnodeBs 250. ANR data with expired lifetime is deleted by the EnodeBs 250. The EnodeBs 250, in turn, periodically transmit the unexpired ANR updates to their attached UEs. Alternatively, the UEs may periodically request the EnodeBs 250 to send ANR updates to them.

Figure 3:
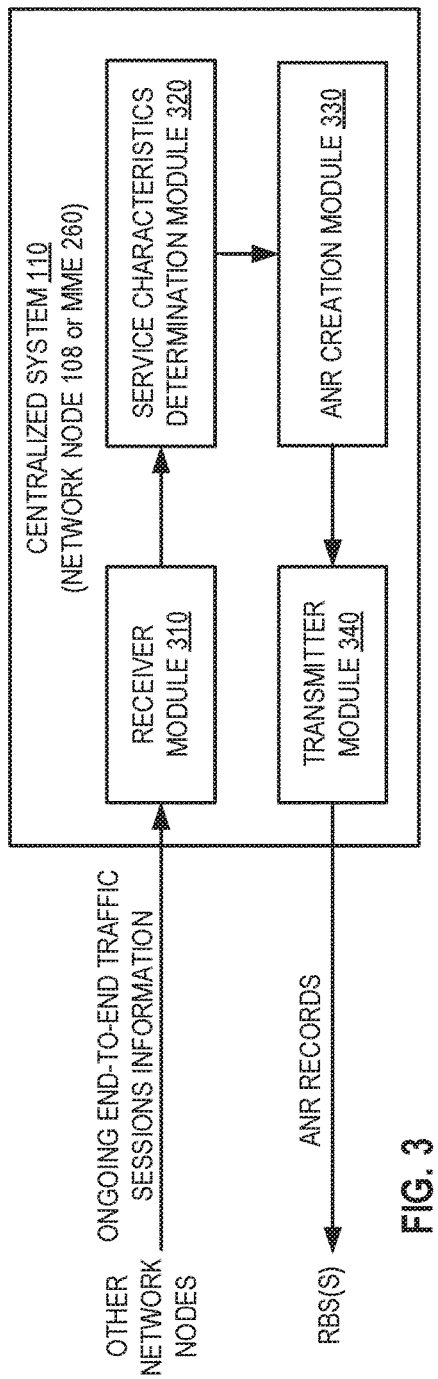
FIG. 3 illustrates a block diagram of a centralized system in a network node for creating ANR data according to one embodiment.

FIG. 3 illustrates a block diagram of the centralized system 110 according to one embodiment. As described before, in some embodiments, the centralized system 110 may be part of the network node 108 of FIG. 1, or the MME 260 of FIG. 2. In a WCDMA network the centralized system 110 may be part of the Radio Network Controller (RNC).

In one embodiment, the centralized system 110 includes a receiver module 310 adapted or operative to collect information of ongoing end-to-end traffic sessions; a service characteristics determination module 320 adapted or operative to determine service characteristics of RBSs based on the collected information; an ANR creation module 330 adapted or operative to create, for each RBS, an ANR record indicating the determined service characteristics of neighboring RBSs, and a transmitter module 340 adapted or operative to transmit the ANR record to each RBS to cause the RBS to propagate the ANR record to attached UEs.

Figure 4:
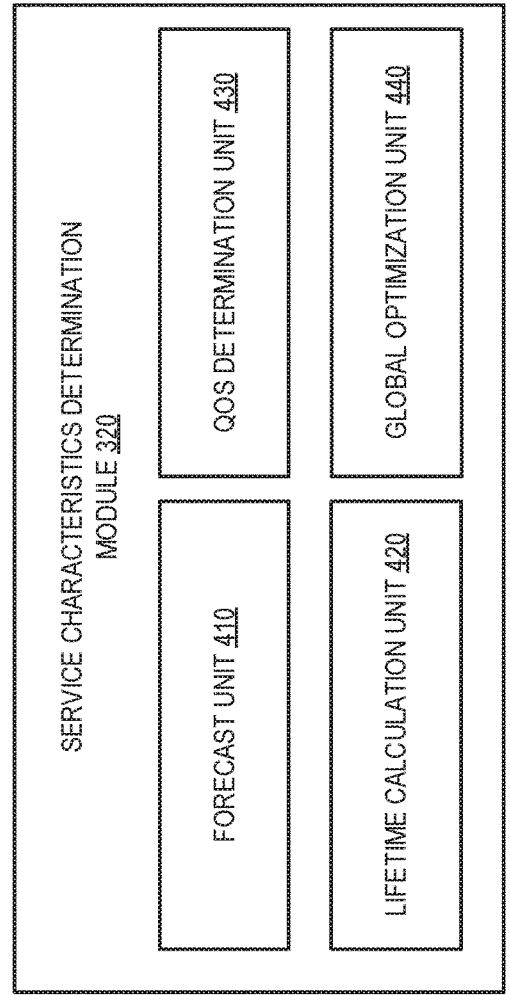
FIG. 4 illustrates a block diagram of a service characteristics determination module in the centralized system according to one embodiment.

FIG. 4 illustrates a block diagram of the service characteristics determination module 320 according to one embodiment. In alternative embodiments, the service characteristics determination module 320 may include additional or alternative units. In one embodiment, each unit in FIG. 4 is hardware or a combination of hardware and software; in alternative embodiments, each unit in FIG. 4 represents functions executed by a processor, e.g., the processor 920 of FIG. 9. In this embodiment, the service characteristics determination module 320 includes a forecast unit 410 to forecast network traffic and node capacity based on the collected ongoing end-to-end traffic sessions information. The service characteristics determination module 320 also includes a lifetime calculation unit 420 to calculate the lifetime of ANR data based on the traffic forecasts and capacity of every network node in the end-to-end traffic paths. The calculated lifetime (also referred to as the lifetime indicator) becomes part of the ANR record to be transmitted to the RBSs. The lifetime indicates when the ANR data expires, or when the confidence of the ANR data becomes lower than a threshold.

In one embodiment, the service characteristics determination module 320 also includes a QoS determination unit 430, which determines or calculates the level of QoS that an RBS can provide. For each ongoing end-to-end traffic session, the QoS determination unit 430 identifies its QoS class, e.g., by its QoS Class Identifier (QCI). In an LTE network, the QCI is used to distinguish different types of bearer traffic; e.g., voice, live streaming video, buffer streaming video, email, file transfer, broadcasting, multicasting, etc. Each type of bearer traffic belongs to a QoS class identified by a QCI. Different QoS classes have different priority levels, delay budgets and packet error/loss budgets. In one embodiment, the QoS determination unit 430 determines or calculates, for each QoS class, the level of QoS that an RBS can provide. Thus, the ANR record may indicate that a particular RBS is suitable for a first QoS class (e.g., buffer streaming video), but is not desirable for a second QoS class (e.g., voice).

In one embodiment, the service characteristics determination module 320 also includes a global optimization unit 440, which determines global optimization policies for optimizing network capacity, network resource utilization, or other network performance metrics. For example, a global optimization policy may specify that the available capacity of an RBS cannot fall below a threshold. When a UE communicates to its RBS ("source RBS") that another RBS ("target RBS") is selected for handover, the source RBS may, according to the global optimization policies, approve or deny the selection. If a target RBS selection is denied, the source RBS may overwrite the selection with another target RBS that is better suited for the UE from a global perspective. In one embodiment, the centralized system 110 may send the global optimization policies to the RBSs in the network, which enforce the policies in response to the UE's RBS selection. In one embodiment, the RBSs may communicate with each other via an inter-RBS protocol, e.g. the x2 interface in an LTE network, to exchange their capacity information.

In one embodiment, the service characteristics determination module 320 also performs one or more of the following tasks: identify whether each RBS is indoors or outdoors, estimate the SINR for different locations in the network, determine the weights for a UE to apply to the different service characteristics, etc.

FIG. 5 illustrates a block diagram of a UE (e.g., the UE 152 of FIG. 1 or FIG. 2) according to one embodiment. In one embodiment, the UE 152 includes a network interface 510 to receive an ANR record 525 from an RBS ("source RBS") to which the UE 152 is attached. The ANR record 525 is derived from information of ongoing end-to-end traffic sessions and indicates service characteristics of neighboring RBSs. The UE 152 also includes a selection module 520 that selects one of the neighboring RBSs for handover based on the ANR record 525. In one embodiment, the UE 152 indicates to the source RBS that a target RBS is selected for handover. The source RBS may approve the selection, or deny the selection and overwrite it with another target RBS. The source RBS then proceeds with the handover process to the target RBS (the one selected by the UE 152 or determined by the source RBS).

FIG. 6 illustrates an example of an ANR record 600 (which may be an embodiment of the ANR record 525 of FIG. 5) according to one embodiment. The ANR record 600 has been created by the centralized system 110 for a source RBS to propagate to its attached UEs (e.g., the UE 152). In this example, each row of the ANR record 600 contains the service characteristics of one of them neighbors (i.e., $RBS_1$, $RBS_2$, ..., $RBS_m$) of the source RBS. For each neighbor, three QoS classes are identified, and two service characteristics (e.g., $SC_1$ and $SC_2$) are further identified under each QoS class. Some of the service characteristics are per neighbor (e.g., estimated signal strength or signal quality such as SINR, Indoor/Outdoor and Lifetime). It is understood that the ANR record 600 may include any number of QoS classes and any number of service characteristics. The value dijk (where, in this example, i=1, ..., m, j=1 or 2, k=1, 2 or 3) indicates a level of performance, e.g., QoS performance such as delay and throughput, etc. In an alternative embodiment, the SINR may be measured by the UE 152 and is not part of the ANR record 600. In yet another embodiment, the UE 152 may combine its own SINR measurements with the SINR in the ANR record 600.

In one embodiment, the UE's selection of an RBS is dependent on the requirement of its traffic session. For each traffic session, the UE 152 may determine a viable RF power strength based on SINR measurements from its neighborhood, and a lifetime based on traffic history and forecast, as well as the QoS requirement. Then the UE 152 uses the ANR data to determine if any RBS can provide the needed performance metrics for the traffic session. If more than one such RBS is available, the UE 152 determines which one of such RBSs is best suited for the requirements of its traffic session.

To determine that an RBS is best suited for the requirements of its traffic session, in one embodiment, the UE 152 applies a weight to each service characteristic and computes a weighted sum. For those service characteristics that are not numerical (e.g., Indoor/Outdoor), the UE 152 may convert them to numerical values according to its preference; e.g., an outdoor UE 152 may convert an "indoor" service characteristic to a smaller value and an "outdoor" service characteristic to a larger value. A lifetime that is near expiring may be converted to a smaller value than a lifetime that just begun. Depending on the requirement of its traffic sessions, the UE 152 may apply different weights to the different service characteristics, where the value of a weight indicates the priority of the service characteristic to which the weight applies. For example, for an indoor UE, the characteristic Indoor/Outdoor may be weighted heavier than the other characteristics; for a voice call traffic session, QoS may be weighted heavier than the other characteristics. In one embodiment, the UE 152 may determine the weights for its traffic sessions; in alternative embodiments, the weights may be determined by the centralized system 110 and transmitted to the UE 152 via its source RBS.

The following example illustrates how the UE 152 may use a weighted sum to select a neighboring RBS. Suppose that an ANR record contains four service characteristics for each neighboring RBS: QoS, Lifetime, SINR and Indoor/Outdoor, which are associated with the weights: $W_{QoS}$, $W_{Lifetime}$, $W_{SINR}$ and $W_{Indoor/Outdoor}$, respectively. The UE 152 calculates the maximum of ($W_{QoS} \times QoS + W_{Lifetime} \times Lifetime + W_{SINR} \times SINR + W_{Indoor/Outdoor} \times Indoor/Outdoor$) among all of the neighboring RBSs in the ANR record. The UE 152 then selects the RBS having the maximum/highest weighted sum to maximize the performance of the UE 152.

Figure 7:
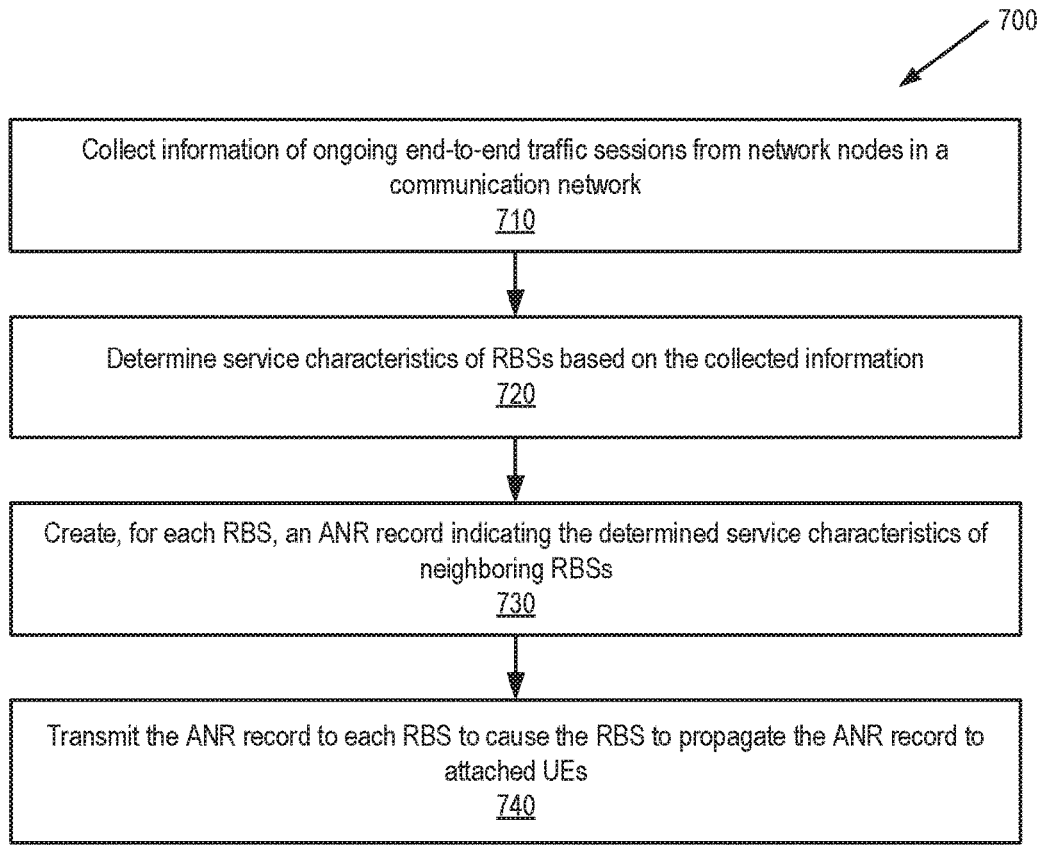
FIG. 7 is a flow diagram illustrating a method of a network node for providing ANR data to UEs according to one embodiment.

FIG. 7 illustrates a method 700 for providing ANR data to UEs. The method 700 is performed by a network node in a communication network, such as the network node 108 of FIG. 1, MME 260 of FIG. 2 or the centralized system 110 of FIG. 3. The method 700 may be performed by hardware (e.g., circuitry, dedicated logic, programmable logic, microcode, etc.), or a combination of hardware and software (e.g., instructions run on a processing device).

The method 700 begins with the network node collecting information of ongoing end-to-end traffic sessions from other network nodes in the communication network (block 710). For example, the network node collects the traffic data on a plurality of paths (or even on all possible paths) from the UEs to one or more Serving Gateways, SGWs, in the communication network. Based on the collected information, the network node determines service characteristics of RBSs in the communication network (block 720). The network node creates, for each RBS, an ANR record indicating the determined service characteristics of neighboring RBSs (block 730). The network node then transmits the ANR record to each RBS to cause the RBS to propagate the ANR record to attached UEs (block 740). For example, the ANR record created for the source RBS comprises one or more data entries of a set of data entries that include a lifetime indicator, an estimated signal strength, usage of QoS classes, and whether the neighboring RBS is indoors or outdoors.

Figure 8:
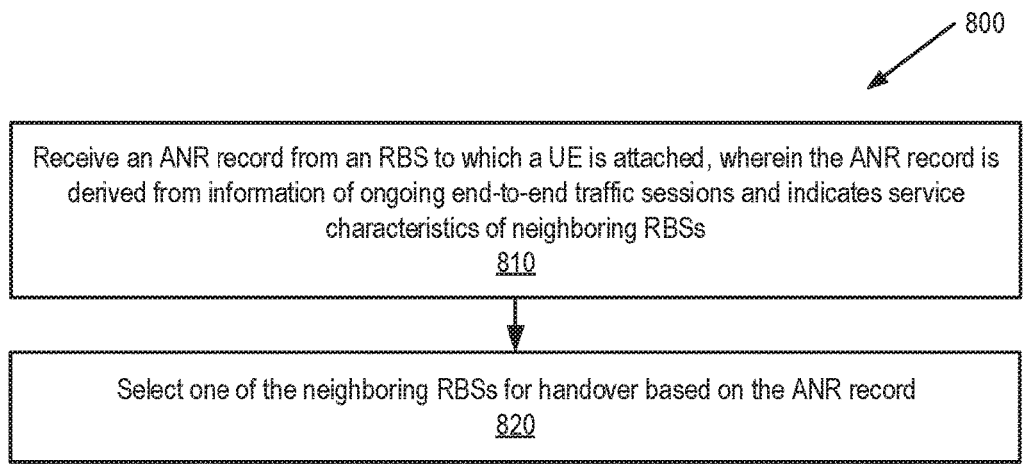
FIG. 8 is a flow diagram illustrating a method of a UE according to one embodiment.

FIG. 8 illustrates a method 800 of a UE (e.g., the UE 152 of FIGS. 1, 2 and 5) in a communication network according to one embodiment. The method 800 may be performed by hardware (e.g., circuitry, dedicated logic, programmable logic, microcode, etc.), or a combination of software (e.g., instructions run on a processing device).

The method 800 begins with the UE receiving an ANR record from an RBS to which the UE is attached (block 810). The ANR record is derived from information of ongoing end-to-end traffic sessions and indicates service characteristics of neighboring RBSs. Based on the ANR record, the UE selects one of the neighboring RBSs for handover (block 820).

Figure 9:
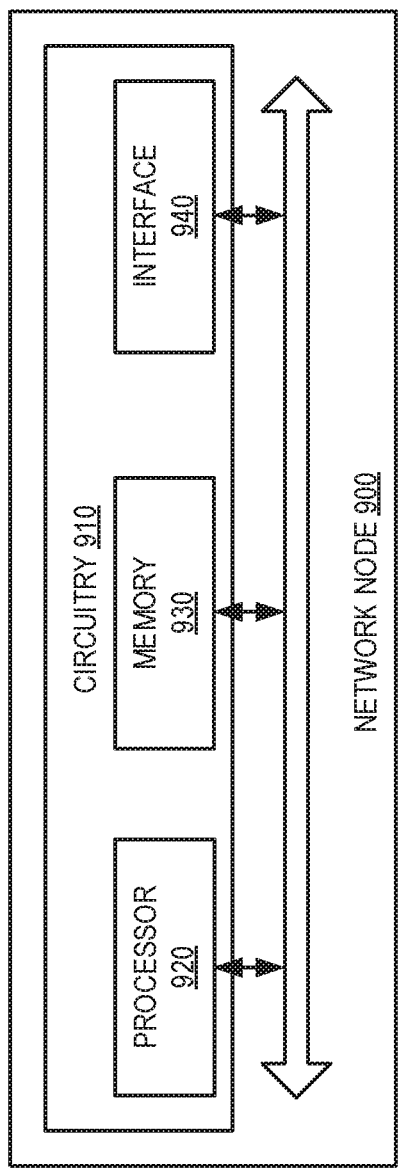
FIG. 9 illustrates a block diagram of a network node according to one embodiment.

FIG. 9 illustrates a network node 900 in a communication network for providing ANR data to UEs according to one embodiment. The network node 900 includes circuitry 910 adapted or operative to cause the network node 900 to perform the method 700. In one embodiment, the circuitry 910 includes a processor 920, a memory 930 and an interface 940. Both the memory 930 and the interface 940 are coupled with the processor 920. The memory 930 contains instructions that when executed cause the processor 920 to perform the method 700. The processor 920 may include one or more general-purpose processing units and/or one or more special-purpose processing units, each of which can be: a microprocessor, a central processing unit (CPU), a multi-core processing unit, an application specific integrated circuit (ASIC), a field programmable gate array (FPGA), a digital signal processor (DSP), a network processor, etc. The memory 930 may include a main memory (e.g., read-only memory (ROM), flash memory, dynamic random access memory (DRAM), etc.), a secondary memory (e.g., a magnetic data storage device, an optical magnetic data storage device, etc.), and different forms of ROMs, different forms of random access memories (RAMs), static RAMs (SRAMs), or any type of media suitable for storing instructions.

Figure 10:
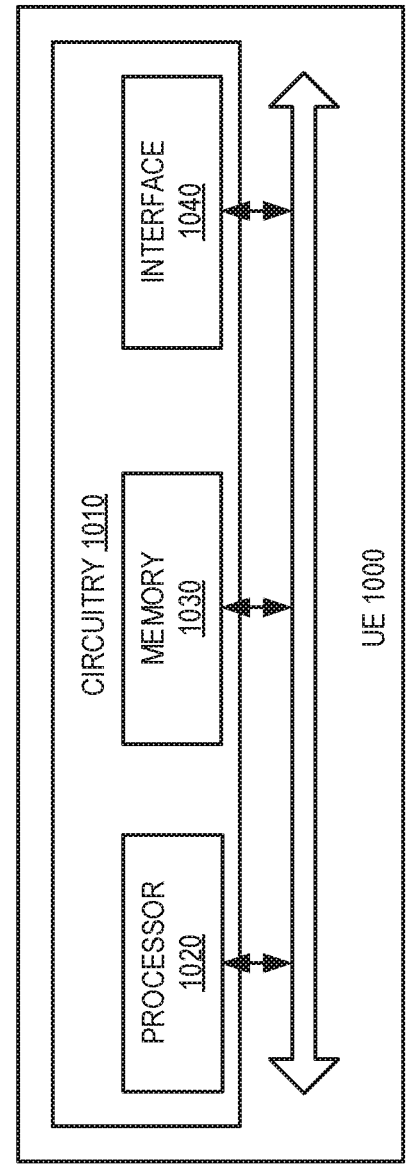
FIG. 10 illustrates a block diagram of a UE according to another embodiment.

FIG. 10 illustrates a UE 1000 in a communication network according to one embodiment. The UE 1000 includes circuitry 1010 adapted or operative to cause the UE 1000 to perform the method 800. In one embodiment, the circuitry 1010 includes a processor 1020, a memory 1030 and an interface 1040. Both the memory 1030 and the interface 1040 are coupled with the processor 1020. The memory 1030 contains instructions that when executed cause the processor 1020 to perform the method 800. The processor 1020 may include one or more general-purpose processing units and/or one or more special-purpose processing units, each of which can be: a microprocessor, a CPU, a multi-core processing unit, an ASIC, a FPGA, a DSP, a network processor, etc. The memory 1030 may include a main memory (e.g., ROM), flash memory, DRAM, etc.), a secondary memory (e.g., a magnetic data storage device, an optical magnetic data storage device, etc.), and different forms of ROMs, different forms of RAMs, SRAMs, or any type of media suitable for storing instructions.

The operations of the flow diagrams of FIGS. 7 and 8 have been described with reference to the exemplary embodiments of FIGS. 3, 5, 9 and 10. However, it should be understood that the operations of the flow diagrams of FIGS. 7 and 8 can be performed by embodiments of the invention other than those discussed with reference to FIGS. 3, 5, 9 and 10, and the embodiments discussed with reference to FIGS. 3, 5, 9 and 10 can perform operations different than those discussed with reference to the flow diagrams. While the flow diagrams of FIGS. 7 and 8 show a particular order of operations performed by certain embodiments of the invention, it should be understood that such order is exemplary (e.g., alternative embodiments may perform the operations in a different order, combine certain operations, overlap certain operations, etc.).

It is to be understood that the above description is intended to be illustrative, and not restrictive. Many other embodiments will be apparent to those of skill in the art upon reading and understanding the above description. Accordingly, the specification and drawings are to be regarded in an illustrative sense rather than a restrictive sense.

What is claimed is:

1. A method performed by a network node in a communication network for providing Automated Neighboring Relation (ANR) data to User Equipments (UEs), the method comprising:
    collecting information of ongoing end-to-end traffic sessions from other network nodes in the communication network;
    determining service characteristics of Radio Base Stations (RBSs) based on the collected information;
    associating the determined service characteristics with a lifetime indicator, wherein the lifetime indicator indicates a specific amount of time which data in the ANR record is good or accurate to reflect a dynamic behavior of traffic in the communication network; and
    creating, for each RBS, an ANR record indicating the determined service characteristics of neighboring RBSs and the associated lifetime indicator; and
    transmitting the ANR record to each RBS to cause the RBS to propagate the ANR record to attached UEs.

2. The method of claim 1, wherein creating the ANR record further comprises:
    identifying a Quality-of-Service (QoS) class among a plurality of QoS classes for each ongoing end-to-end traffic session; and
    creating, for each RBS, the ANR record that indicates the service characteristics per QoS class of the neighboring RBSs.

3. The method of claim 1, wherein, for each neighboring RBS of a source RBS, the ANR record created for the source RBS comprises one or more data entries of a set of data entries that include an estimated signal strength, usage of QoS classes, and whether the neighboring RBS is indoors or outdoors.

4. The method of claim 1, wherein collecting the information further comprises:
    collecting traffic data on a plurality of paths from the UEs to one or more Serving Gateways (SGWs) in the communication network.

5. The method of claim 1, further comprising:
    determining global optimization policies for optimizing network capacity based on the collected information, wherein an RBS selected by the UE is approved or denied according to the global optimization policies.

6. The method of claim 1, wherein the communication network is a Long Term Evolution (LTE) network and the RBSs are EnodeBs in the LTE network.

7. A network node in a communication network for providing Automated Neighboring Relation (ANR) data to User Equipments (UEs), the network node comprising:
    a circuitry adapted to cause the network node to:
    collect information of ongoing end-to-end traffic sessions from other network nodes in the communication network;
    determine service characteristics of Radio Base Stations (RBSs) based on the collected information;
    associate the determined service characteristics with a lifetime indicator, wherein the lifetime indicator indicates a specific amount of time which data in the ANR record is good or accurate to reflect a dynamic behavior of traffic in the communication network; and
    create, for each RBS, an ANR record indicating the determined service characteristics of neighboring RBSs and the associated lifetime indicator; and
    transmit the ANR record to each RBS to cause the RBS to propagate the ANR record to attached UEs.

8. The network node of claim 7, wherein the circuitry comprises a processor, a memory and an interface both coupled with the processor, the memory containing instructions that when executed cause the processor to:
    collect information of ongoing end-to-end traffic sessions from other network nodes in the communication network;
    determine service characteristics of Radio Base Stations (RBSs) based on the collected information;
    associate the determined service characteristics with a lifetime indicator, wherein the lifetime indicator indicates a specific amount of time which data in the ANR record is good or accurate to reflect a dynamic behavior of traffic in the communication network; and
    create, for each RBS, an ANR record indicating the determined service characteristics of neighboring RBSs and the associated lifetime indicator; and
    transmit the ANR record to each RBS to cause the RBS to propagate the ANR record to attached UEs.

9. The network node of claim 7, wherein the memory contains instructions that when executed further cause the processor to:
    identify a Quality-of-Service (QoS) class among a plurality of QoS classes for each ongoing end-to-end traffic session; and
    create, for each RBS, the ANR record that indicates the service characteristics per QoS class of the neighboring RBSs.

10. The network node of claim 7, wherein, for each neighboring RBS of a source RBS, the ANR record created for the source RBS comprises one or more data entries of a set of data entries that include an estimated signal strength, usage of QoS classes, and whether the neighboring RBS is indoors or outdoors.

11. The network node of claim 7, wherein the memory contains instructions that when executed further cause the processor to collect traffic data on a plurality of paths from the UEs to one or more Serving Gateways (SGWs) in the communication network.

12. The network node of claim 7, wherein the memory contains instructions that when executed further cause the processor to determine global optimization policies for optimizing network capacity based on the collected information, wherein an RBS selected by the UE is approved or denied according to the global optimization policies.

13. The network node of claim 7, wherein the communication network is a Long Term Evolution (LTE) network and the RBSs are EnodeBs in the LTE network.

* * * * *